United States Patent
Yin et al.

(10) Patent No.: US 10,522,458 B2
(45) Date of Patent: Dec. 31, 2019

(54) METHOD OF TUNING COMPONENTS WITHIN AN INTEGRACTED CIRCUIT DEVICE

(71) Applicant: NXP USA, Inc., Austin, TX (US)

(72) Inventors: Yi Yin, Munich (DE); Ziqiang Tong, Ottobrunn (DE)

(73) Assignee: NXP USA, Inc., Austin, TX (US)

( * ) Notice: Subject to any disclaimer, the term of this patent is extended or adjusted under 35 U.S.C. 154(b) by 85 days.

(21) Appl. No.: 15/833,033

(22) Filed: Dec. 6, 2017

(65) Prior Publication Data
US 2018/0182705 A1    Jun. 28, 2018

(30) Foreign Application Priority Data
Dec. 23, 2016  (EP) .................................. 16206605

(51) Int. Cl.
| | | |
|---|---|---|
| *G06F 17/50* | (2006.01) | |
| *H01L 23/522* | (2006.01) | |
| *H01L 23/66* | (2006.01) | |
| *H01L 21/56* | (2006.01) | |
| *H01L 23/64* | (2006.01) | |

(52) U.S. Cl.
CPC ...... *H01L 23/5227* (2013.01); *G06F 17/5068* (2013.01); *G06F 17/5081* (2013.01); *H01L 21/56* (2013.01); *H01L 23/645* (2013.01); *H01L 23/66* (2013.01); *G06F 2217/40* (2013.01); *G06F 2217/82* (2013.01); *G06F 2217/84* (2013.01)

(58) Field of Classification Search
CPC .................................................. H01L 23/5227
USPC ........................................................ 716/110
See application file for complete search history.

(56) References Cited

U.S. PATENT DOCUMENTS

| | | | |
|---|---|---|---|
| 3,947,934 A | | 4/1976 | Olson |
| 5,701,032 A | * | 12/1997 | Fischer ................ H01L 23/13 |
| | | | 257/690 |
| 5,982,244 A | | 11/1999 | Fujisaki |
| 6,181,225 B1 | | 1/2001 | Bettner |
| 6,189,201 B1 | | 2/2001 | Trzaskowski et al. |
| 7,239,163 B1 | * | 7/2007 | Ralston-Good .... G01R 31/2884 |
| | | | 257/48 |
| 7,774,625 B1 | * | 8/2010 | Sheng ................... G06F 1/3203 |
| | | | 713/300 |
| 7,823,102 B2 | * | 10/2010 | Chandra ............. G06F 17/5009 |
| | | | 716/106 |

(Continued)

OTHER PUBLICATIONS

Starzer, F. et al; "A low phase noise VCO in eWLB package"; IEEE Electronics Packaging Technology Conference; pp. 326-329 (Dec. 5, 2012).

*Primary Examiner* — Suresh Memula
(74) *Attorney, Agent, or Firm* — Charlene R. Jacobsen

(57) ABSTRACT

A method of tuning inductive and/or capacitive components within an integrated circuit device. The method comprises measuring bare-die mounted performance of such a component formed within a semiconductor die, determining a package distribution layer pattern for the at least one component for achieving a desired performance for the at least one component based at least partly on the measured bare-die mounted performance, and packaging the semiconductor die with the determined package distribution layer pattern for the at least one component.

9 Claims, 4 Drawing Sheets

(56) References Cited

U.S. PATENT DOCUMENTS

| | | | |
|---|---|---|---|
| 8,286,111 B2* | 10/2012 | Chandra | G06F 17/5036 |
| | | | 716/110 |
| 2004/0000970 A1 | 1/2004 | Killen et al. | |
| 2008/0030280 A1 | 2/2008 | Floyd et al. | |
| 2009/0007030 A1* | 1/2009 | Nehmadi | G03F 1/36 |
| | | | 716/136 |
| 2009/0030660 A1* | 1/2009 | Celik | G06F 17/5018 |
| | | | 703/2 |
| 2009/0236701 A1 | 9/2009 | Sun et al. | |
| 2010/0068831 A1* | 3/2010 | Barber | H01L 22/12 |
| | | | 438/13 |
| 2010/0332208 A1* | 12/2010 | Victory | G06F 17/5036 |
| | | | 703/14 |
| 2011/0063937 A1* | 3/2011 | Eid | G11C 5/143 |
| | | | 365/226 |
| 2013/0328582 A1* | 12/2013 | Han | H01Q 9/0442 |
| | | | 324/750.02 |
| 2014/0310671 A1 | 10/2014 | Beer et al. | |
| 2016/0190673 A1 | 6/2016 | Huang et al. | |
| 2017/0116367 A1* | 4/2017 | Bickford | G06F 17/5081 |
| 2019/0114381 A1* | 4/2019 | Lin | G06F 17/5068 |

\* cited by examiner

METHOD OF TUNING COMPONENTS WITHIN AN INTEGRACTED CIRCUIT DEVICE

CROSS-REFERENCE TO RELATED APPLICATIONS

This application claims the priority under 35 U.S.C. § 119 of European patent application no. 16206605.4, filed Dec. 23, 2016 the contents of which are incorporated by reference herein.

DESCRIPTION

Field of the Invention

This invention relates to a method of tuning at least one of inductive and capacitive components within an integrated circuit device.

Background of the Invention

Radio frequency (RF) and millimetre wave (mmw) integrated circuit design suffers from insufficient accuracy of the device model due to the complicated parasitic capacitances and inductances that occur in reality, and moreover from a missing effective post-processing method for performance adjustment and improvement. It is well known that it is difficult to design a circuit by simulation alone to achieve the expected results. In particular, the modelling of capacitive and inductive devices such as transmission lines, inductors, transformers, etc. is not accurate enough for RF and millimetre-wave circuit design, which causes difficulties in designing accurate RF and millimetre-wave circuits such as passive filters, passive power dividers, passive resonators, and active oscillators which comprise LC tank resonators, etc. Simple back-end adjustment of capacitive and inductive values is therefore required.

Conventional integrated circuit back-end adjustment techniques are typically only applicable for transmission lines, and involve adjusting the length of the transmission lines at wafer level. For devices such as spiral inductors and transformers it is very difficult to have a useful trimming model, especially for integrated circuits.

Accordingly, the conventional approach to improve the design is based on measurement results to re-design and re-optimize the inductive device, and therefore to compensate any unexpected performance degradation mostly due to parasitic influences. However, such an approach typically requires at least one month more after the first measurement of the primitive design and additional procedures for completing the final re-design and wafer re-production.

SUMMARY OF THE INVENTION

The present invention provides a method of tuning at least one of inductive and capacitive components within an integrated circuit device and an integrated circuit device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
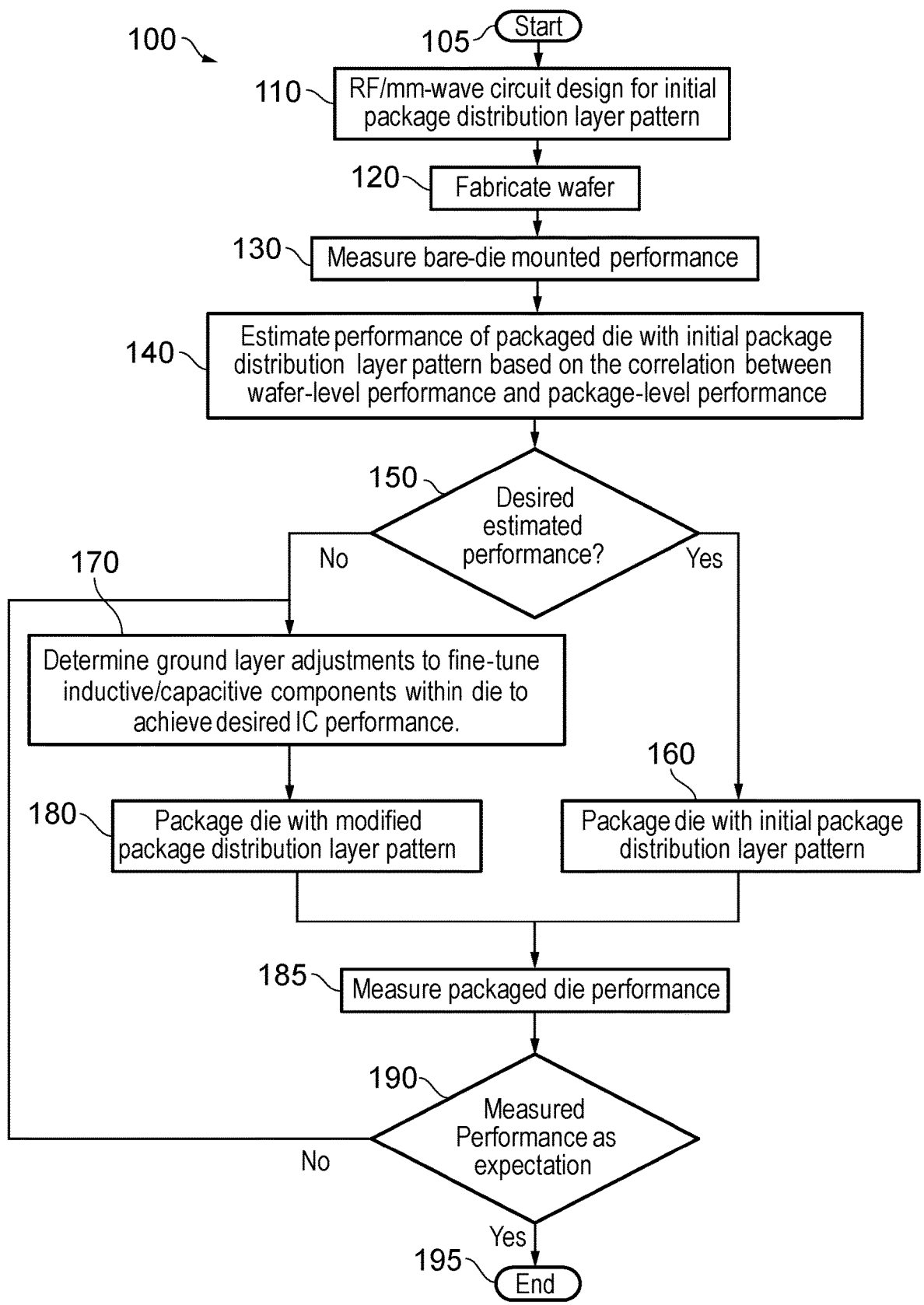
FIG. 1 illustrates a simplified flowchart of an example embodiment of a method of tuning capacitive and inductive components within an integrated circuit device.

Example embodiments of the present invention will now be described with reference to the accompanying drawings. However, it will be appreciated that the present invention is not limited to the specific examples herein described and as illustrated in the accompanying drawings.

RF and millimetre-wave circuit design suffers from insufficient accuracy due to complicated parasitic capacitive and inductive influences. It is difficult to design a circuit to meet desired specifications by way of simulation alone. Specifically, the model of capacitive and inductive elements such as transmission lines, inductors, transformers, etc. is generally not accurate enough in RF and millimetre-wave circuit design, causing difficulties in designing accurate passive circuits such as passive filters, passive power dividers, and passive resonators, or even active circuits such as oscillators which use LC tank resonators. As such, simple and effective post-processing adjustment of capacitive and inductive values is expected to trim the circuit performance.

Conventional post-trimming can only be done for transmission lines by changing the length of the transmission line. For spiral inductors and transformers it is very difficult to have a useful trimming model, especially within integrated circuits. As a result, spiral inductors and transformers can typically not be trimmed by post-processing in integrated circuit designs. Therefore, if the desired IC performance cannot be achieved, complete redesign is necessary. Furthermore, such conventional back-end techniques require at least one month and additional procedures to complete the re-optimized design and wafer back-end re-production, which adds a significant delay in the overall design cycle for the integrated circuit.

In accordance with some example embodiments, there is proposed a method of tuning inductive and/or capacitive components within an integrated circuit device comprising measuring bare-die mounted performance of one or more component(s) formed within a semiconductor die, determining a package distribution layer pattern for the, or each, component for achieving a desired performance for the component(s) based at least partly on the measured bare-die mounted performance, and packaging the semiconductor die with the determined package distribution layer pattern.

In this manner, any unexpected performance due to parasitic capacitive and/or inductive influences can be compensated for by way of the package distribution layer pattern on the surface top, such as described in greater detail below. As a result, inductive and capacitive components within a semiconductor die can be tuned using the package distribution layer pattern, and thus without the need for re-producing a new wafer during back-end adjustment. Advantageously, such a method of tuning inductive/capacitive components within an integrated circuit device significantly reduces the delay in the overall design cycle as compared with conventional techniques, and provides a practical tuning method for not only transmission lines as usual, but also spiral inductors, transformers, etc. that are difficult to tune within integrated circuit devices using conventional techniques.

In accordance with some example embodiments, the proposed method may comprise adjusting a distance of package distribution layer pattern to the surface and/or an overlapping coverage of one or more package ground layers to the component being tuned and/or the thickness of the package ground layers(s) overlapping the component being tuned, which can effectively tune the inductive and/or capacitive component values. In order to make the performance trimming more predictable, a design PDK (process design kit) for all capacitive and inductive tuneable components such as transmission lines, inductances, capacitors, transformers, etc. may be created at wafer level and also at package level. Such a PDK generation is well known in semiconductor industry on wafer level, and typically comprises a measurement and modelling process of components on wafer. In some example embodiments it is contemplated that such a PDK can be enhanced to the package level by a measurement and modelling process on package for each tuneable component with different package distribution layer patterns as described in greater detail below.

FIG. 1 illustrates a simplified flowchart 100 of an example of a method of tuning capacitive and inductive components within an integrated circuit device. The method of FIG. 1 starts at 105 and moves on to 110 where a radio-frequency (RF) or millimetre-wave (mm-wave) circuit is designed for an initial package distribution layer pattern. For example, such a circuit design may be performed by way of an electronic design automation (EDA) process, and may involve one or more of:

Design flow (for example comprising high-level and logical synthesis, component placement and layout, etc.);

simulation (for example comprising transistor and logic simulation, high-level (behavioural) simulation, electromagnetic field solving, etc.); and Analysis and verification (for example comprising functional verification, clock domain crossing verification, equivalence checking, static timing analysis, etc.).

In the illustrated example, the layout and design of capacitive and inductive components are designed for an integrated circuit (IC) based on package-level models for capacitance and inductance, which include wafer-level and package-level models, may be derived as described in greater detail with reference to FIG. 2. The circuit typically includes not only capacitive and/or inductive components, but also other types of components such as CMOS (complementary metal-oxide semiconductor) components, HBT (Heterojunction Bipolar Transistor) components, resistors, etc. may be designed and optimized based on initial package-level models, and simulated performance by using wafer-level models as a comparable performance reference with the optimized performance. A wafer is then fabricated at 120 based on the designed layout.

Bare-die mounted IC performance for the fabricated wafer is then measured, at 130. In this manner, the wafer-level performance of the bare-die mounted IC may be obtained. The packaged IC performance with initial package distribution layer pattern can then be estimated based on a correlation between the measured wafer-level performance of the bare-die mounted IC and simulated wafer-level and package-level performance at 140. The wafer-level and package-level models may be derived as described in greater detail with reference to FIG. 2.

Having estimated the packaged IC performance with the initial package distribution layer pattern, it is then determined whether the estimated packaged die performance achieves a desired IC performance, at 150.

If it is determined that the estimated packaged die performance does not achieve the desired performance, the method of FIG. 1 moves on to 170 where package ground layer adjustments are determined, for example through simulation based on package-level models, to fine-tune inductive/capacitive components within the semiconductor die in order to achieve the desired IC performance. Such adjustments may comprise, for example, ground layer thickness, distance between ground layer and semiconductor die surface, ground layer overlap of inductive/capacitive component, etc. The tuneable capacitive/inductive components may comprise, for example, inductors, capacitors, transmission lines and transmission line based devices such as couplers, transformers, etc. Notably, transmission lines, which can be used as inductances or capacitances in RF and mm-wave circuits, have the most effective tuning capacity by changing the package distribution layer pattern on its surface. An example explanation of how a transmission line may be fine-tuned by way of modification of the package ground layer is provided below with reference to FIGS. 12 to 14.

Having determined the package ground layer adjustments at 170, the method of FIG. 1 moves on to 180 where the package distribution layer pattern is modified in accordance with the determined package ground layer adjustments in order to achieve the desired packaged IC performance by tuning the capacitive/inductive component(s) and the semiconductor die is packaged with the modified distribution layer pattern. The performance of the packaged semiconductor die is then measured, at 185, and it is determined whether the packaged semiconductor die achieves the desired IC performance at 190 based on the measured performance. If it is determined that the packaged semiconductor die achieves the desired performance, the method ends 195. Conversely, if it is determined that the packaged semiconductor die does not achieve the desired performance, the method of FIG. 1 loops back to 170 again further adjustments to the distribution layer pattern are determined to fine-tune the inductive/capacitive components within the semiconductor die in order to achieve the desired IC performance.

Referring back to 150, if it is determined that the estimated packaged die performance does achieve the desired performance, the method moves on to 160 where the semiconductor die is packaged with the initial distribution layer pattern. The performance of the packaged IC is then measured at 185 and checked at 190 to determine whether it achieves the desired IC performance.

In some further embodiments, it is contemplated that the method may further comprise selecting an inter-layer dielectric material based at least partly on the measured bare-die mounted performance, and packaging the semiconductor die using the selected inter-layer dielectric material between the package re-distribution layers. In this manner, the permittivity of the dielectric material may also be modified in order to achieve a required performance of capacitive/inductive components within the semiconductor die.

Figure 2:
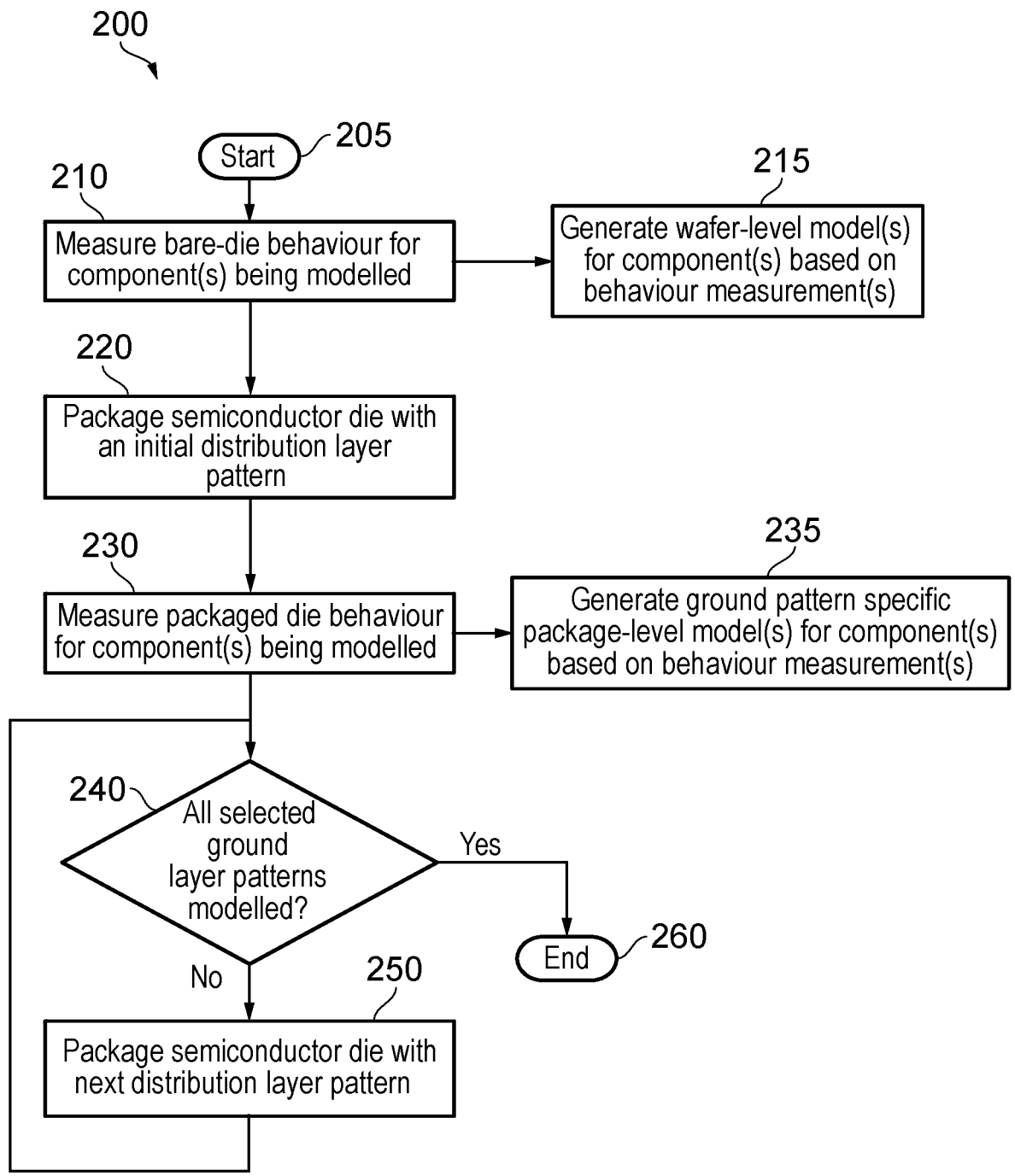
FIG. 2 illustrates a simplified flowchart of an example embodiment of a method of model generation for use during the design and fabrication of integrated circuit device.
Figure 3:
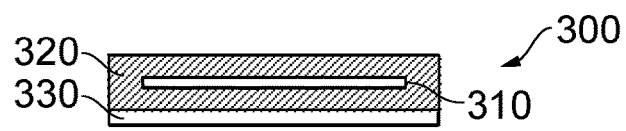
FIG. 3 schematically illustrates a simplified cross-sectional view of a part of a bare-mounted semiconductor die.

Referring now to FIG. 2, there is illustrated a simplified flowchart 200 of an example embodiment of a method of model generation for use during the design and optimization of integrated circuit devices. The method of FIG. 2 starts at 205 and moves on to 210, where bare-die behaviour for each individual component being modelled is measured. FIG. 3 schematically illustrates a simplified cross-sectional view of a part of a bare-mounted semiconductor die 300 comprising a component 310 being modelled formed within an inter-layer dielectric material (from silicon dioxides to newer low-K insulators) 320, and a substrate 330 on the bottom. By measuring the bare-die behaviour of the component 310, a wafer-level model for the fundamental component can be generated, as illustrated at 215 in FIG. 2. The components being modelled may comprise, for example, capacitive and inductive devices such as transmission lines, inductors, transformers, etc., as well as other types of components such as CMOS components, HBT components, resistors, etc. The wafer-level models may form part of a wafer-level process design kit (PDK) for the IC design.

Figure 4:
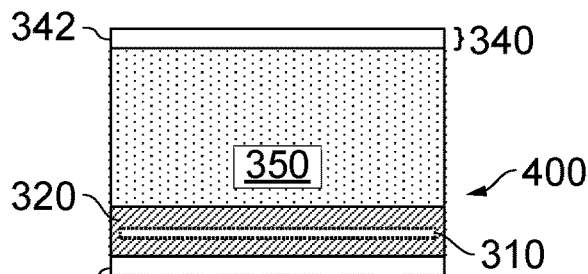
FIGS. 4 to 10 schematically illustrate simplified cross-sectional views of parts of integrated circuit devices comprising equivalent packaged semiconductor dies comprising an inductive and/or a capacitive component being modelled with different package distribution layer patterns.
Figure 5:
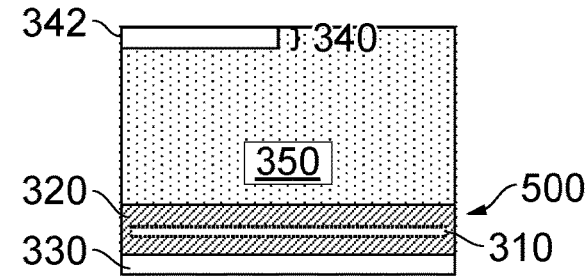
Figure 6:
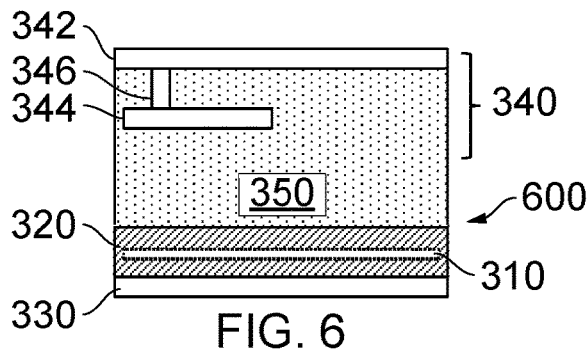
Figure 7:
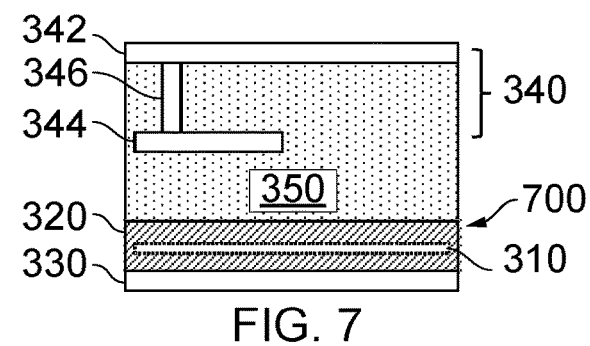
Figure 8:
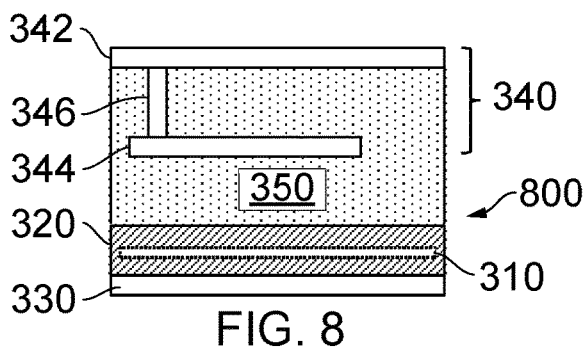
Figure 9:
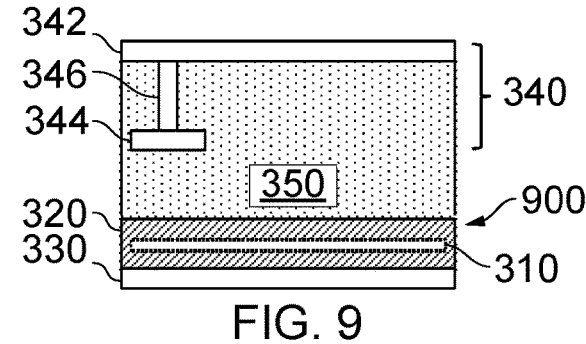
Figure 10:
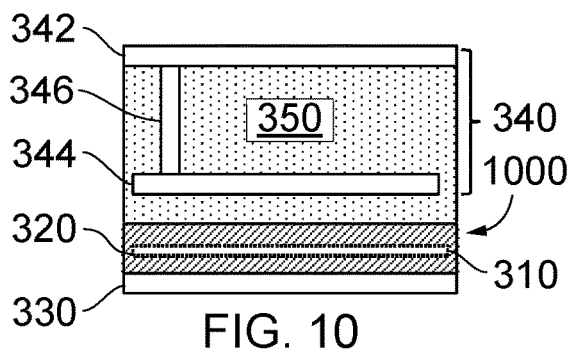

Referring back to FIG. 2, having measured the bare-die behaviour and generated the wafer-level model(s), the method moves on to 220 where in the illustrated example a semiconductor die comprising the component(s) being modelled are packaged with an initial ground layer patter. For example, the semiconductor die may be packaged with an outmost redistribution layer providing an overlying ground layer, for example as illustrated in FIG. 4. In FIG. 4, the distribution layer pattern 340 comprises an outermost re-distribution layer (RDL) 342 overlapping the respective component 310 being modelled within the semiconductor die 400. Alternatively, and as illustrated in FIG. 5, the distribution layer pattern 342 may comprise an outermost RDL 340 that partially overlaps the respective component 310 being modelled within the semiconductor die 500. A dielectric material 350 is used to fill the space between the semiconductor die 400-1000 and the package ground layers 342.

Referring back to FIG. 2, the packaged behaviour for each individual component being modelled is then measured, at 230, and a distribution layer pattern specific package-level model for the packaged component(s) is generated, as illustrated at 235. As previously described, the inductive and capacitive values of packaged components are heavily depended on the overlying distribution layer pattern and its overlap area. Accordingly, in the example illustrated in FIG. 2, packaged behaviour for the component(s) being modelled is measured for a plurality of different package distribution layer patterns and corresponding package-level models generated within steps 230 to 250.

For example, FIGS. 4 to 10 schematically illustrate simplified cross-sectional views of integrated circuit devices comprising equivalent packaged semiconductor dies 600-1000 comprising the inductive component 310 being modelled with different package distribution layer patterns. In the examples illustrated in FIGS. 6 to 10, the package distribution layer pattern 340 comprises a top-level ground layer 342 formed by the outer re-distribution layer of the packaged semiconductor die 600-1100 (e.g. an outermost re-distribution layer), for example the top-level ground layer 342 comprising an overlying ground layer for the respective semiconductor die 600-1000 as a whole. In FIGS. 6 to 10, the package distribution layer pattern 340 comprises a further ground layer 344 formed by an inner re-distribution layer of the packaging. The further ground layer 344 formed by the inner re-distribution layer may comprise a component specific ground layer arranged to at least partially overlap the respective component 310 being modelled, and may be shorted to the top-level ground layer 342 by way of a via 346 or the like. A dielectric material 350 is used to fill the space between the semiconductor die 600-1000 and the package ground layers 342, 344.

As illustrated in FIGS. 4 to 10, each of the packaged semiconductor dies 400-1000 is packaged with different package distribution layer patterns 340 for the component 310 being modelled. For example, the different package distribution layer patterns 340 may comprise ground layers 342, 344 having different overlapping coverage over the component 310 being modelled and being spaced at different distances from the component 310 being modelled. For example, in FIGS. 6 and 7 the package distribution layer patterns 340 comprise further ground layers 344 comprising approximately 50% coverage of the component 310, but formed within different re-distribution layers and thus spaced at different distances from the component 310. In addition, the further ground layers 344 in FIGS. 8 and 9 comprise approximately 75% and 25% coverage respectively, whist the further ground layer 344 in FIG. 10 comprises approximately 100% coverage and is formed within a still further re-distribution layer.

Thus, in this manner behaviour measurements for the component 310 being modelled may be obtained for different package distribution layer patterns 340, whereby the different package distribution layer patterns 340 differ by way of, for example, a distance and/or an overlapping coverage of one or more package ground layers 342, 344 in relation to the component 310 being modelled.

In some further embodiments, it is contemplated that the method may further comprise obtaining performance measurements for the different package distribution layer patterns 340 in relation to different dielectric materials 350 having different relative permittivity characteristics between the semiconductor die and the package ground layers 342, 344.

Referring back to FIG. 2, at 240, having not modelled all components for each possible distribution layer pattern with different distance and/or coverage to each component, the method moves on to 250 where the type of package ground pattern of each component to be modelled is changed and moves back to 230 for re-measurement and the corresponding modelling. In the illustrated example a package-level model is generated for the, or each, component being modelled based on the performance measurement for a possible distribution layer pattern. The obtained model can be used for example for simulating and estimating the packaged die performance at 140 and 170 in FIG. 1. In some example embodiments, such an initial package distribution layer pattern may comprises a ground layer formed within a middle package redistribution layer arranged to provide approximately 50% coverage of the component being modelled. For example, from the package distribution layer patterns 340 of FIGS. 4 to 10, the package distribution layer pattern illustrated in FIG. 6 in which the further ground layer 344 comprises approximately 50% coverage of the component 310 and is formed within the first (middle) re-distribution layer. In this manner, the tuning capabilities from modifying the package distribution layer pattern are optimized in each direction (i.e. for increasing and decreasing the parasitic capacitive effects of the packaging.

Referring back to FIG. 2, once package-level models have been generated for each intended distribution layer pattern, then method ends at 260.

Figure 11:
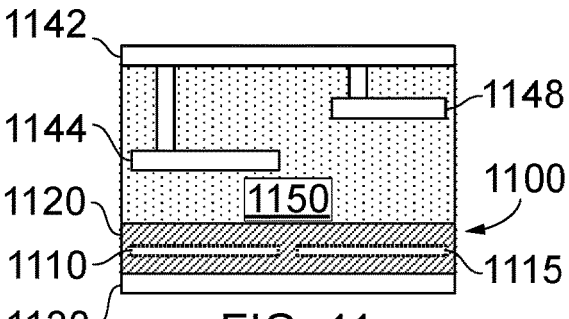
FIG. 11 schematically illustrates a simplified cross-sectional view of an integrated circuit device comprising packaged semiconductor die having multiple inductive components and different package distribution layer patterns.

FIG. 11 schematically illustrates a simplified cross-sectional view of an integrated circuit device comprising packaged semiconductor die 1100 having multiple inductive components 1110, 1115. In the example illustrated in FIG. 11, the packaged semiconductor die 1100 comprises a first package distribution layer pattern provided above a first inductive component 1110. The first package distribution layer pattern comprises a top-level ground layer 1142 formed by an outer re-distribution layer of the packaged semiconductor die 1100. For example, the top-level ground layer 1142 may comprise an overlying ground layer for the respective semiconductor die 1100 as a whole. The first package distribution layer pattern comprises a first further ground layer 1144 formed by a first inner re-distribution layer of the packaging. In the illustrated example, the first further ground layer 1144 formed by the inner re-distribution layer is arranged to provide approximately 100% coverage of the first component 1110, and is coupled to the top-level ground layer 1142 by way of a via. In the example illustrated in FIG. 11, the packaged semiconductor die 1100 comprises a second package distribution layer pattern provided above a second inductive component 1115. The second package distribution layer pattern comprises the top-level ground layer 1142 formed by the outer re-distribution layer of the packaged semiconductor die 1100. The second package distribution layer pattern comprises a second further ground layer 1148 formed by a second inner re-distribution layer of the packaging. In the illustrated example, the second further ground layer 1146 formed by the inner re-distribution layer is arranged to provide approximately 75% coverage of the second component 1115, and is coupled to the top-level ground layer 1142 by way of a via. Thus, it is contemplated that package distribution layer patterns may be individually adapted for each capacitive and/or inductive component within a semiconductor die.

Figure 12:
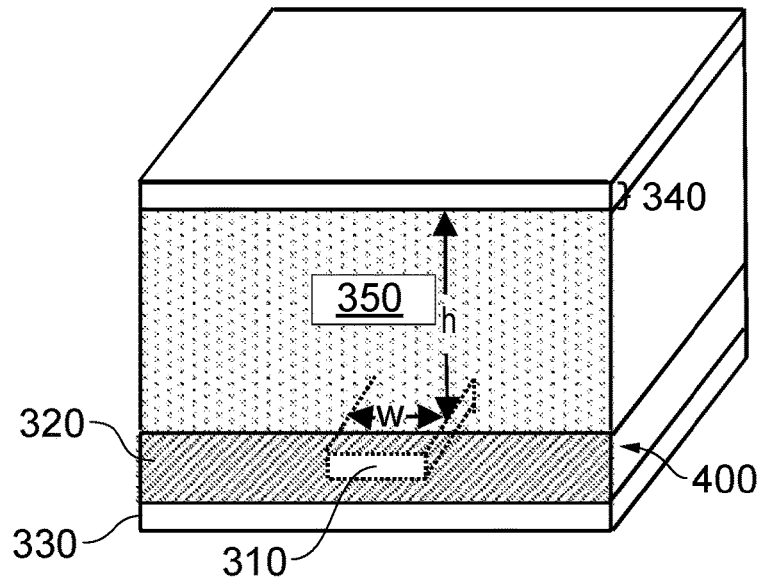
FIG. 12 shows a general transmission line.
Figure 13:
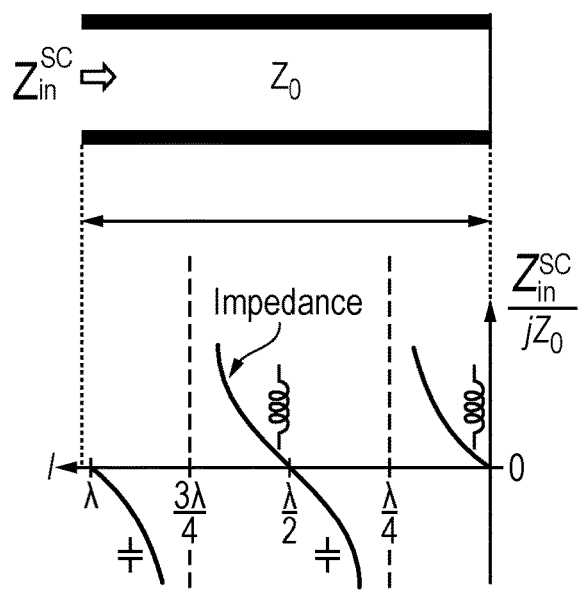
FIG. 13 illustrates a short circuit.
Figure 14:
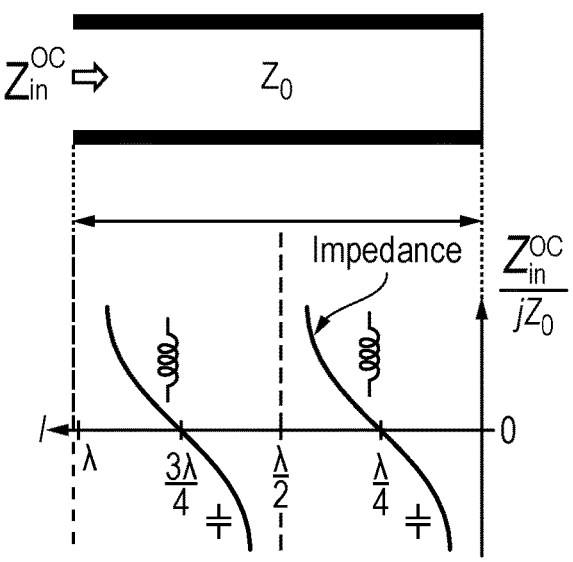
FIG. 14 illustrates an open transmission line.

An example explanation of how a transmission line may be fine-tuned by way of modification of the package ground layer will now be provided with reference to FIGS. 12 to 14. A general transmission line is illustrated in FIG. 12 comprising a transmission line 310, a first dielectric material 320, a substrate 330, and a ground layer 340 within the package filled by a further dielectric material 350 between transmission line 310 and the package ground layer 340. The characteristic impedance $Z_0$ and propagation constant $\gamma$ can be expressed as below, respectively:

$$Z_0 = \sqrt{(R+j\omega L)/(G+j\omega C)} \quad \text{Equation 1}$$

$$\gamma = (R+j\omega L)(G+j\omega C) \quad \text{Equation 2}$$

R is the resistance per unit length, considering the two conductors to be in series, L is the inductance per unit length, G is the conductance of the dielectric per unit length, C is the capacitance per unit length, j is the imaginary unit, and $\omega$ is the angular frequency.

The inductance and capacitance per unit length may be approximated to:

$$L \sim \frac{\mu h}{w} \quad \text{Equation 3}$$

$$C \sim \frac{\varepsilon w}{h} \quad \text{Equation 4}$$

Respectively, where $\mu$ is the conductor conductivity factor, $\varepsilon$ is the permittivity of filled dielectric material between the transmission line, h is the distance between the ground layer and the transmission line, and w is the width of the transmission line.

From Equations 3 and 4 the transmission line characterization parameters such as L, C, the effective permittivity the characteristic impedance and the propagation constant are dependent on the distance or/and the overlap coverage of the distribution layer pattern in relation to the transmission line. The change of characteristic impedance and the phase of the propagation of transmission line can be used to change the circuit performance, for example in relation to the frequency insertion loss, return loss and power loss, by adjusting the distribution layer pattern over the surface of the transmission line or/and transmission line based devices within the packaged IC.

Moreover, a lossless input impedance of a transmission line can be expressed as:

$$Z_{in} = Z_0 \frac{Z_L + j\tan\beta l}{1 + jZ_L\tan\beta l} \quad \text{Equation 5}$$

$\beta$: propagation of the transmission line, and l: length of transmission line, For a short circuit, as illustrated in FIG. 13, the transmission line has a inductive impedance when the length of the transmission line is less than ¼ of the signal wavelength or between ½ and ¼ the wavelength, and the equivalent inductance is:

$$j\omega L_{eq} = jZ_0 \tan \beta l, \text{ if } \tan \beta l \geq 0 \quad \text{Equation 6}$$

The transmission line has a capacitive impedance when the length of the transmission line is between ¼ and ½ of the signal wavelength or between ¼ and 1 wavelength. The equivalent capacitance can be expressed as:

$$\frac{1}{j\omega C_{eq}} = jZ_0\tan\beta l, \text{ if } \tan\beta l \leq 0 \quad \text{Equation 7}$$

An open transmission line, as illustrated in FIG. 14, can be treated as an inductance or a capacitance depended only on the length of transmission line in comparison with the length of wavelength. The inductive or capacitive impedance is similar as for a shorted transmission line circuit, which is depended only on the characteristic impedance and the phase of propagation of the transmission line. Whereas the characteristic impedance and the phase of propagation of the transmission line both can be changed by proposed post-processing the ground pattern over the transmission line.

Thus example embodiments of a method for tuning inductive and/or capacitive components within an integrated circuit device have been described using 'topside' ground patterns formed by on-wafer package redistribution layers. Notably, from Equation 1 above it can be seen that by changing the package distribution layer pattern over a component, the parasitic capacitance from the package distribution layer pattern can be modified, enabling the characteristic impedance of the component to be tuned over a wide range. For example, in the case of a transmission line (typically used to implement inductors within integrated circuits) having a length less than λ/4, the packaging effects the properties of the transmission line in two ways:
(i) the characteristic impedance $Z_0$; and
(ii) the effective permittivity $\varepsilon_{eff}$ of the dielectric material.

For low frequencies, or shorter transmission line lengths, the characteristic impedance effects are dominant, reducing the inductance value. For higher frequencies or longer transmission line lengths, effective permittivity $\varepsilon_{eff}$ of the dielectric material may compensate the characteristic impedance effects.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

Moreover, the terms 'front,' 'back,' 'top,' 'bottom,' 'over,' 'under' and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of tuning at least one of inductive and capacitive components within an integrated circuit device; the method comprising:
   measuring bare-die mounted performance of at least one component formed within a semiconductor die;
   determining a package distribution layer pattern for the at least one component for achieving a desired performance for the at least one component based at least partly on the measured bare-die mounted performance; and
   packaging the semiconductor die with the determined package distribution layer pattern for the at least one component.

2. The method of claim 1, wherein the method comprises:
   estimating a packaged die performance for the at least one component for an initial package distribution layer pattern based at least partly on the measured bare-die mounted performance;
   determining whether the estimated packaged die performance achieves the desired performance for the at least one component; and
   if it is determined that the estimated packaged die performance does not achieve the desired performance, modifying the distribution layer pattern for the at least one component to achieve the desired packaged performance.

3. The method of claim 2, wherein if it is determined that the estimated performance for the at least one component does not achieve the desired packaged performance for the at least one component, the method further comprises:
   determining ground layer adjustments for achieving the desired packaged performance for the at least one component; and
   modifying the package distribution layer pattern for the at least one component based at least partly on the determined ground layer adjustments.

4. The method of claim 2, wherein the estimated performance for the at least one component is determined based at least partly on pre-defined package-level models of component performance in relation to different package distribution layer patterns.

5. The method of claim 4, wherein the method further comprises generating package-level models corresponding to the at least one component; the method comprising:
   measuring bare-die mounted behaviour for the at least one component to be modelled;

measuring packaged behaviour for the at least one component for a plurality of package distribution layer patterns; and generating package-level models for the at least one component based on the measured bare-die and packaged behaviours for the at least one component.

6. The method of claim 2, wherein modifying the distribution layer pattern for the at least one component comprises at least one of:

modifying an overlapping coverage of at least one package ground layer over the at least one component; and changing a package redistribution layer used for forming the at least one package ground layer over the at least one component.

7. The method of claim 2, wherein the initial package distribution layer pattern comprises a ground layer formed within a middle package redistribution layer arranged to provide 50% coverage of the at least one component.

8. The method of claim 1, wherein the method comprises designing a wafer layout for the semiconductor die based at least partly on wafer-level models for the at least one component.

9. The method of claim 1, where the method further comprises selecting an inter-layer dielectric material based at least partly on the measured bare-die mounted performance, and packaging the semiconductor die with the selected inter-layer dielectric material.

* * * * *